(12) United States Patent
Lim et al.

(10) Patent No.: US 10,281,641 B2
(45) Date of Patent: May 7, 2019

(54) OPTICAL INSERTS AND WAVEGUIDE FIXTURES COMPRISING THE SAME

(71) Applicant: Cree, Inc., Durham, NC (US)

(72) Inventors: Jin Hong Lim, Durham, NC (US);
Corey Goldstein, Milwaukee, WI (US);
Kurt Wilcox, Libertyville, IL (US);
Mark Dixon, Morrisville, NC (US);
Scott Fisher, Raleigh, NC (US)

(73) Assignee: CREE, INC., Durham, NC (US)

( * ) Notice: Subject to any disclaimer, the term of this patent is extended or adjusted under 35 U.S.C. 154(b) by 0 days.

(21) Appl. No.: 15/347,413

(22) Filed: Nov. 9, 2016

(65) Prior Publication Data
US 2018/0128960 A1 May 10, 2018

(51) Int. Cl.
*G02B 6/36* (2006.01)
*G02B 6/38* (2006.01)
*G02B 6/42* (2006.01)
*F21V 8/00* (2006.01)

(52) U.S. Cl.
CPC ......... *G02B 6/0055* (2013.01); *G02B 6/0088* (2013.01); *G02B 6/0031* (2013.01); *G02B 6/0068* (2013.01)

(58) Field of Classification Search
CPC .. G02B 6/0055; G02B 6/0088; G02B 6/0068; G02B 6/0031
See application file for complete search history.

(56) References Cited

U.S. PATENT DOCUMENTS

| | | | |
|---|---|---|---|
| 6,550,952 B1* | 4/2003 | Hulse | G02B 6/0018 362/555 |
| 7,591,567 B2* | 9/2009 | Wilcox | F21V 7/06 362/297 |
| 8,033,693 B2* | 10/2011 | Tan | H01L 33/60 362/297 |
| D650,515 S * | 12/2011 | Bradley, Jr. | D26/118 |
| 8,328,378 B2* | 12/2012 | Chen | H01L 33/58 362/97.1 |
| 8,337,051 B2* | 12/2012 | Hawkes | F21V 7/10 362/296.05 |
| 2009/0275157 A1* | 11/2009 | Winberg | H01L 33/20 438/29 |

* cited by examiner

*Primary Examiner* — Tracie Y Green
(74) *Attorney, Agent, or Firm* — J. Clinton Wimbish; Nexsen Pruet, PLLC

(57) ABSTRACT

In one aspect, lighting devices are described herein. A lighting device comprises an optic housing, a waveguide optic and an optical insert positioned in the housing, the optical insert comprising one or more reflective sidewalls for redirecting light emitted from the waveguide optic. The waveguide optic comprises sidewalls and a light extraction face including extraction elements, wherein the reflective sidewalls of the optical insert cover at least a portion of the sidewalls of the waveguide optic.

39 Claims, 13 Drawing Sheets

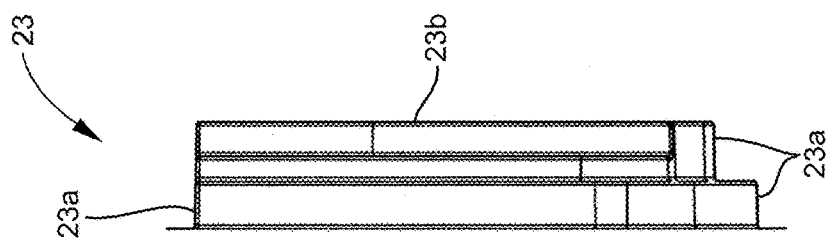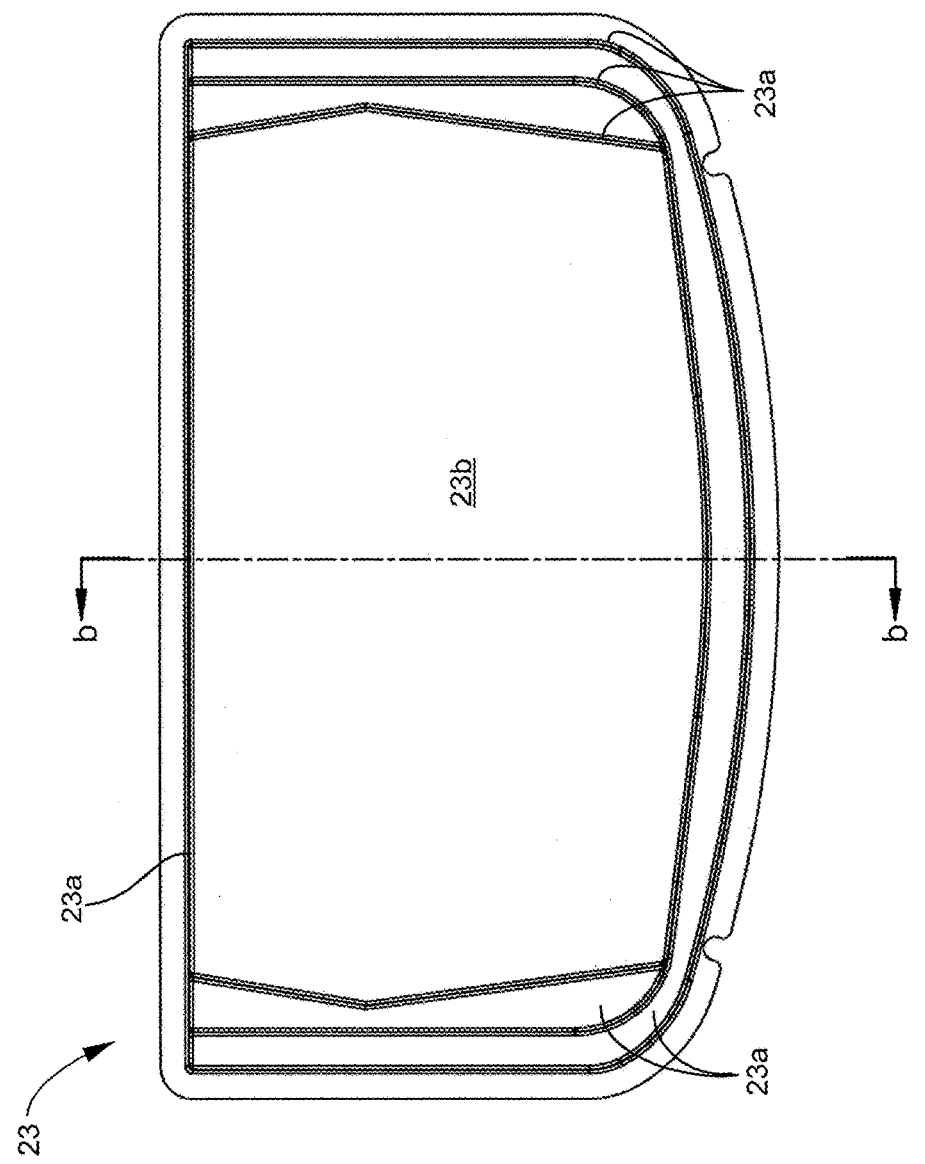
FIG. 5(a)
FIG. 5(b)

OPTICAL INSERTS AND WAVEGUIDE FIXTURES COMPRISING THE SAME

FIELD

The present invention relates to optical devices and, in particular, to lighting devices employing optical inserts in conjunction with waveguide optics to provide desired light distributions.

BACKGROUND

A waveguide optic mixes and directs light emitted by one or more light sources, such as one or more light emitting diodes (LEDs). A typical waveguide optic generally includes a waveguide body and one or more extraction elements. The extraction element(s) determine how light is removed by controlling where and in what direction the light exits the waveguide. By appropriately shaping waveguide surfaces, one can control the flow of light across the extraction element(s). Selecting the spacing, shape and other characteristic(s) of the extraction elements affects the appearance of the waveguide and its resulting angular distribution of emitted light and efficiency.

The ability to tightly control and shape the distribution of emitting light makes waveguide optics an attractive option for lighting fixtures. However, many lighting fixtures include standard or universal components designed to simplify manufacturing and enhance cost efficiencies. Lighting fixtures, such as sidewalk, roadway and/or parking lot fixtures, often employ a standard housing for optical components. In some cases, standard optical housings are incompatible with one or more waveguide optic designs. A standard housing can negatively alter lighting distribution of a waveguide optic, thereby precluding use of the waveguide optic with the housing for a desired application. For example, a standard optic housing can be employed in roadside fixtures as well as fixtures mounted at or near the roadway center. Design of the standard optic housing may be compatible with waveguide optics providing a Type 2 or Type 3 distribution while disrupting waveguide optics of Type 5 distribution.

SUMMARY

In view of these disadvantages, lighting devices are described herein comprising optical inserts which can facilitate use of differing waveguide optics with standard optical housings. Briefly, a lighting device comprises an optic housing, a waveguide optic and an optical insert positioned in the housing, the optical insert comprising one or more reflective sidewalls for redirecting light emitted from the waveguide optic. By redirecting emitted light, the optical insert can assist in maintaining the desired lighting distribution from the waveguide optic independent of optic housing design. The waveguide optic can comprise sidewalls and a light extraction face including extraction elements, wherein the reflective sidewalls of the optical insert cover at least a portion of the sidewalls of the waveguide optic. The optical insert, in some embodiments, is positioned between the waveguide optic and optic housing.

In another aspect, optical inserts for optical assemblies are provided. An optical insert of an assembly comprises one or more reflective sidewalls for redirecting light emitted from a waveguide optic housed by the assembly, the waveguide optic comprising sidewalls and a light extraction face. Reflective sidewalls of the optical insert can have arrangement or spacing to cover at least a portion of the waveguide optic sidewalls. In some embodiments, the reflective side walls form a continuous border partially or fully enclosing the waveguide optic sidewalls.

These and other embodiments are described further in the following detailed description.

BRIEF DESCRIPTION OF THE DRAWINGS

FIG. 5(a) illustrates a top plan view of an optical insert according to some embodiments.

FIG. 5(b) is a cross-sectional view of the optical insert taken along the A-A line of FIG. 5(a).

DETAILED DESCRIPTION

Figure 1:
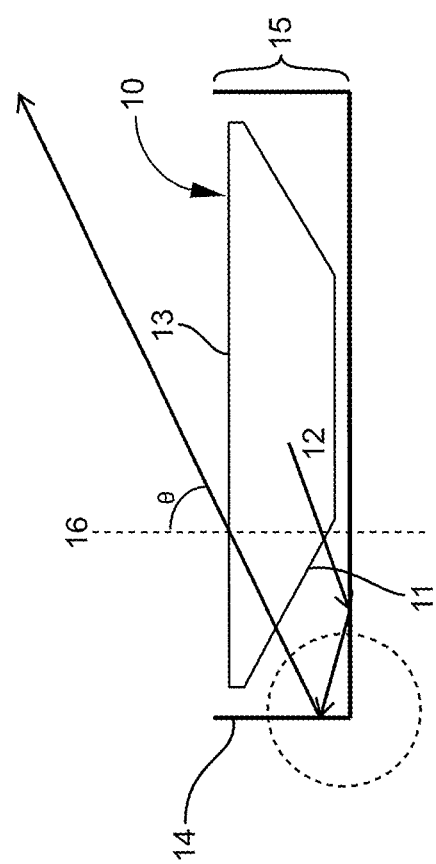
FIG. 1 illustrates redirection of light through the waveguide extraction face by a reflective sidewall of an optical insert according to one embodiment.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In one aspect, lighting devices are described herein. A lighting device comprises an optic housing, a waveguide optic and an optical insert positioned in the housing, the optical insert comprising one or more reflective sidewalls for redirecting light emitted from the waveguide optic. The waveguide optic comprises sidewalls and a light extraction face including extraction elements, wherein the reflective sidewalls of the optical insert cover at least a portion of the sidewalls of the waveguide optic. In some embodiments, reflective sidewalls of the optical insert form a continuous border or band partially or fully enclosing the sidewalls of the waveguide optic. By covering waveguide optic sidewalls or portions thereof, the reflective sidewalls of the optical insert are operable to redirect light emitted from the waveguide optic sidewalls. In some embodiments, the reflective sidewalls redirect such light to pass through the waveguide extraction face at angles providing desired light distributions of the lighting device. Therefore, optical inserts described herein can enable use of a waveguide optic with optical housings having structure and/or design incompatible with the intended light distribution from the waveguide optic. Accordingly, a standard or universal optic housing or optic box can be provided for optic assemblies of various applications where specific lighting distributions are controlled by selection of the waveguide optic and optical insert.

FIG. 1 illustrates redirection of light through the waveguide extraction face by a reflective sidewall of an optical insert according to one embodiment. In the embodiment of FIG. 1, light 12 exiting a sidewall 11 of the waveguide optic 10 is redirected by a reflective sidewall 14 of the optical insert 15. The light 12 is redirected to pass through the extraction face 13 of the waveguide optic 10 at the desired angle(s), θ, relative to an axis 16 normal to the extraction face 13. In alternative embodiments, one or more reflective sidewalls of the optical insert can redirect light exiting sidewalls of the waveguide optic back into the body of the waveguide for further redirection and extraction by elements of the extraction face. In further embodiments, one or more reflective sidewalls direct a first portion of light to pass through the extraction face at desired angles while also redirecting a second portion of light back into the waveguide body for further redirection and extraction by elements of the extraction face. As described further herein, reflective sidewalls of the optical insert can redirect light emitted from sidewalls of the waveguide optic to provide peak emission from the lighting device at angles greater than 60 degrees relative to nadir. In other embodiments, reflective sidewalls of the optical insert can redirect light emitted from sidewalls of the waveguide optic to provide peak emission from the lighting device at angles less than 60 degrees relative to nadir.

Arrangement of reflective sidewalls of the optical insert relative to sidewalls of the waveguide optic can be governed by several considerations including, but not limited to, shape and light distribution properties of the waveguide optic, structural and design features of the optic housing and desired light distribution of the lighting device. In some embodiments, for example, the optic housing comprises one or more reflective walls or surfaces that work in conjunction with reflective sidewalls of the optical insert. In such embodiments, the optical insert need not include reflective sidewalls at positions overlapping with reflective surfaces or structures of the optical housing. For example, the optical housing can comprise a reflective base wall and/or sidewalls working in conjunction with the reflective sidewalls of the optical insert to redirect light exiting sidewalls of the waveguide optic. As described further herein, the optical insert can be a single piece. Alternatively, the optical insert can comprise multiple pieces. In some embodiments, reflective sidewalls of the optical insert are provided in multiple pieces. The multiple pieces can be connected and arranged in any continuous manner to cover sidewalls of the waveguide optic. In other embodiments, multiple reflective sidewall pieces can exhibit a discontinuous or segmented arrangement around sidewalls of the waveguide optic. Multiple reflective sidewall pieces of the optical insert, for example, can be spaced apart along sidewalls of the waveguide optic. Spacing of the reflective sidewalls can be governed by optical properties of the waveguide and/or reflective structures of the optic housing. In some embodiments, reflective structures of the optic housing can reside between reflective sidewall pieces of the optic insert. Multiple reflective sidewall pieces permit numerous arrangements along sidewalls of the waveguide optic, thereby facilitating various light distributions from the lighting device. Light distribution can be tailored, in some embodiments, based on arrangement of the reflective sidewall pieces along one or more sidewalls of the waveguide optic.

In some embodiments, one or more reflective sidewalls of the optical insert are terraced or stepped. Terraced reflective sidewalls can have any desired number of levels or steps not inconsistent with objectives of the present invention. Specific layout of terraced reflective sidewalls can be determined according to several considerations including, but not limited to, sidewall geometry and design of the waveguide optic, desired light distribution from the lighting device and design of the optic housing. In some embodiments, terracing of the reflective sidewalls matches terraced sidewalls of the waveguide optic. In other embodiments, terracing of reflective sidewalls of the optical insert does not match or is offset from terraced sidewalls of the waveguide optic. In being terraced, the reflective side walls comprise vertical and horizontal segments. The vertical and horizontal segments can have any orientation relative to one another. In some embodiments, vertical and horizontal segments are normal to one another. In other embodiments, vertical and horizontal segments have a non-normal orientation. For example, the vertical segments can slope in a forward or backward direction. In further embodiments, terraced reflective sidewalls of the optical insert can comprise several horizontal and vertical segments in a normal orientation and several horizontal and vertical segments in a non-normal orientation. Terraced reflective sidewalls can be employed with non-terraced reflective sidewalls of the optical insert, in some embodiments. In other embodiments, all the reflective sidewalls can be terraced.

Terracing the reflective sidewalls can enable optical inserts described herein to efficiently use narrow and/or limited spacing between the optic housing and waveguide while maintaining desired lighting distributions and optical performance. Terracing the reflective sidewalls also provides a variety of design options when single or non-terraced reflective wall(s) are not suitable or incompatible with structural features of the optic housing and/or waveguide.

The optical insert, in some embodiments, comprises at least one sidewall aperture for interfacing a sidewall of the waveguide optic with a light source, such as a plurality of LEDs. In some embodiments, a light coupling region of the waveguide optic extends through the sidewall aperture for interfacing with the LEDs. The optical insert can further comprise one or more reflective sleeves adjacent to the sidewall aperture, the sleeves covering the light coupling region of the waveguide optic. In some embodiments, the reflective sleeves are continuous with the sidewall aperture. In other embodiments, the reflective sleeves are discontinuous and detachable from the sidewall aperture. When detachable from the sidewall aperture, the reflective sleeves can be provided as a separate, independent piece of the optical insert. The reflective sleeves can return light to the waveguide optic that has escaped in the light coupling region. Light rays failing to meet total internal reflection requirements in the coupling region can leak out of the waveguide. The reflective sleeves redirect these light rays back into to the coupling region for redistribution in the waveguide optic leading to optical efficiency enhancements. In some embodiments, the reflective sleeves are angle to match or substantially match geometry of the waveguide optic. Therefore, the reflective sleeves can form a sidewall aperture entrance geometry matching geometry of the waveguide optic.

In some embodiments, the optical insert also comprises a reflective base wall. The reflective base wall can cover at least a portion of the waveguide optic base. In some embodiments, the reflective base wall covers the entire base of the waveguide optic. In some embodiments, the reflective base wall may work in conjunction with one or more reflective surfaces of the optic housing to cover the waveguide optic base. Design of the reflective base wall can be selected according to several considerations including, but not limited to, the structure and design of the waveguide optic, the design of the optic housing and desired light distribution of the lighting device. As described further herein, the one or more reflective side walls and reflective base wall can define a reflective compartment in which the waveguide optic is positioned. The reflective compartment can partially or fully enclose sidewalls and the base of the waveguide optic. Reflective sidewalls of the optical insert can form various angles with the reflective base wall. In some embodiments, one or more reflective sidewalls for an angle with the reflective base wall of 85 degrees to 95 degrees. For example, one or more sidewalls can be normal to the base wall. Notably, reflective sidewalls are not required to directly intersect the base wall to form an angle with the base wall. A projection from a sidewall not intersecting the base wall can be drawn to determine angular orientation between the side wall and base wall. In some embodiments, all reflective sidewalls of the optical insert form the same angle with the reflective base wall. In other embodiments, reflective sidewalls exhibit differing angular orientation relative to the base wall. As illustrated in FIG. 1, reflective sidewall orientation can affect or set angles at which light exiting sidewalls of the waveguide optic is redirected through the optic extraction face and onto lighted surfaces. In some embodiments wherein the optical insert does not comprise a base wall, the reflective sidewalls can form any of the foregoing angular orientations with a wall of the optical housing, including a base wall of the optical housing.

The reflective sidewalls and reflective base wall can comprise specularly reflective surfaces. In some embodiments, the optical insert is formed by folding one or more specularly reflective sheets to provide the reflective sidewall(s) and reflective base wall. The sheets can exhibit enhanced specular reflectance (ESR). For example, a specular reflector film can be laser cut and subsequently folded into the optical insert having architecture described herein. In some embodiments, a single, continuous specular reflector film or sheet can be folded to provide an optical insert as a single piece. In other embodiments, multiple specular reflector sheets can be cut and folded to provide the optical insert in multiple pieces as described above. Suitable specular reflector films, including ESR films, are commercially available from 3M of St. Paul, Minn. In other embodiments, an optical insert described herein can be thermoformed directly from a specularly reflective sheet. Optical inserts may also be thermoformed from non-specularly reflective materials, such as from a thermoplastic sheet, and subsequently metallized to provide specularly reflective sidewall(s) and base wall. Suitable metals for metallization processes include silver and aluminum. In further embodiments, reflective sidewalls and/or the reflective base wall can be formed of a combination of specularly reflective sheets and metallized surfaces. For example, reflective sidewalls of the optical insert can comprise metallized surfaces while the base wall and reflective sleeves comprise ESR film. Any combination of the metallized surfaces and specularly reflective film are contemplated for the optical insert.

In some embodiments, the reflective sidewalls and/or reflective base wall of the optical insert can comprise surfaces providing diffuse reflectance. An optical insert, for example, can be formed by folding one or more sheets having diffuse reflectance properties to provide the reflective sidewall(s) and/or reflective base wall as described above. An optical insert may also be thermoformed from a material comprising surfaces exhibiting diffuse reflectance. In further embodiments, an optical insert can comprise any desired combination of specularly reflective surfaces and surfaces of diffuse reflectance. In some embodiments, one or more sidewalls are specularly reflective while other sidewall(s) exhibit diffuse reflectance. Various sections of optical insert sidewalls and/or base wall can be specularly reflective with other sections having diffuse reflectance. In some embodiments, vertical sidewall sections are specularly reflective while horizontal sidewall sections have diffuse reflectance. In embodiments wherein the optical insert is provided in multiple pieces, any combination of specularly reflective pieces and diffuse reflectance pieces is contemplated. The number and arrangement of specularly reflective surfaces and surfaces of diffuse reflectance can selected according to several considerations including, but not limited to, shape and light distribution properties of the waveguide optic, structural and design features of the optic housing and desired light distribution of the lighting device.

Figure 2:
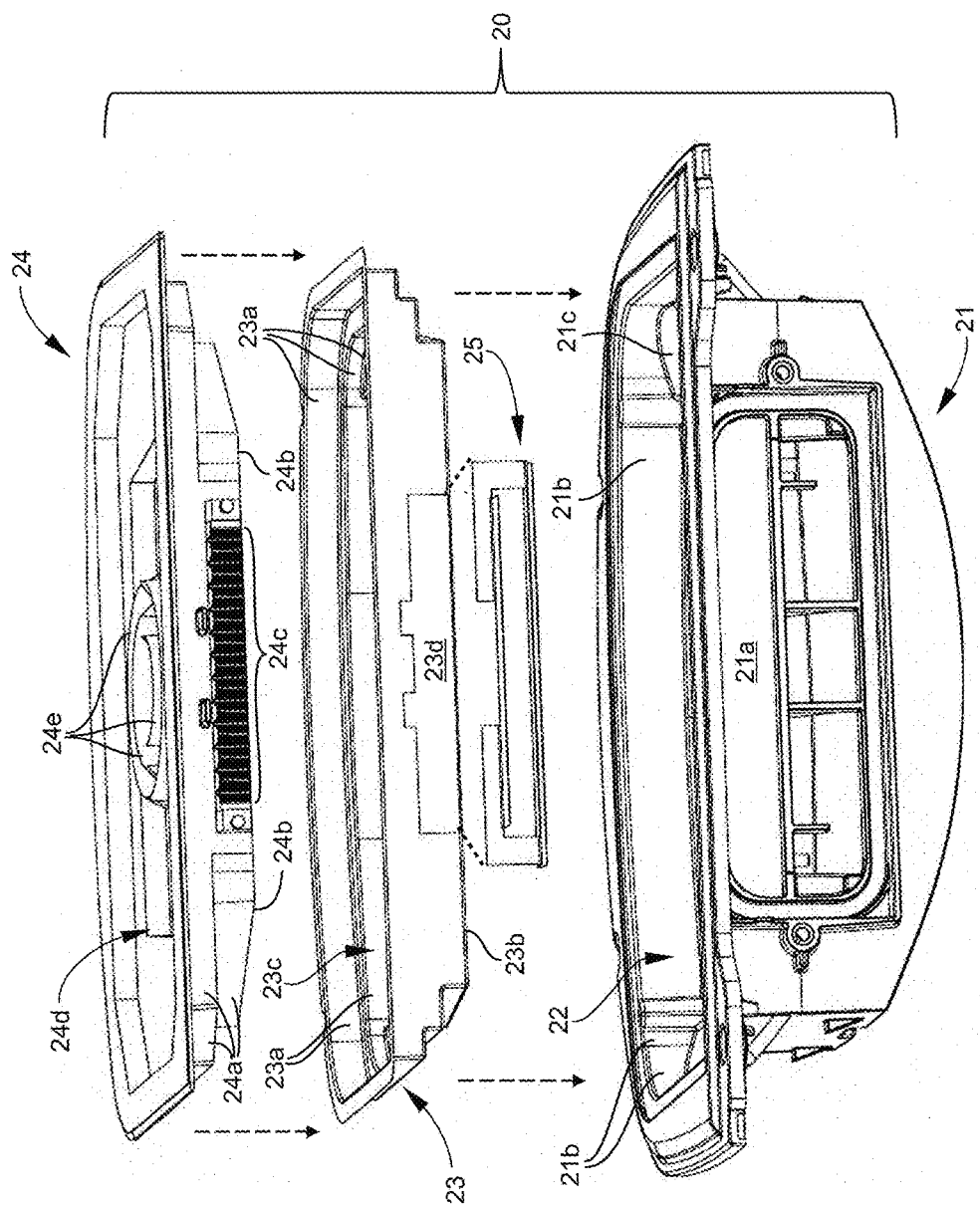
FIG. 2 illustrates an exploded view of an optic assembly of a lighting device according to some embodiments.

The foregoing architectures and operational principles of the optical insert, associated waveguide optic and optic housing are further described with reference to the non-limiting embodiments illustrated in FIGS. 2-13. FIG. 2 provides an exploded view of an optic assembly of a lighting device according to some embodiments. The optic assembly 20 comprises an optic housing 21 defining a compartment 22 for receiving the optical insert 23. The optical insert 23 comprises reflective sidewalls 23a and a reflective base wall 23b. The reflective sidewalls 23a and reflective base wall 23b define a compartment 23c for receiving the waveguide optic 24. The waveguide optic 24 comprises sidewalls 24a, a base 24b, a light coupling region 24c and light extraction face 24d. In the embodiment of FIG. 2, the light extraction face 24d comprises annular light extraction elements, facets or features 24e. Specific features and elements of the waveguide optic 24 are detailed in U.S. patent application Ser. No. 15/192,979 entitled "Luminaires Utilizing Optical Waveguide" by Lim et al. incorporated herein by reference in its entirety. When the waveguide optic 24 is positioned in the compartment 23c, reflective sidewalls 23a and reflective base wall 23b cover and enclose sidewalls 24a of the waveguide optic 24. The reflective sidewalls 23a are terraced matching sidewall 24a arrangement of the waveguide optic 24. The optical insert 23 comprises a sidewall aperture 23d for interfacing the waveguide optic 24 with a light source, such as a plurality of LEDs. The light coupling region 24c of the waveguide optic 24 can extend through the sidewall aperture 23d for interfacing with LEDs. Reflective sleeves 25 can be positioned adjacent to the sidewall aperture 23c, the reflective sleeves 25 covering the light coupling region 24c of the waveguide optic 24. In the embodiment of FIG. 2, the reflective sleeves 25 are provided as a separate piece. The optic housing 21 comprises one or more sidewall apertures 21a for receiving the LEDs. In the embodiment of FIG. 2, the optical insert 23 fully encloses the sidewalls 24a and base 24b of the waveguide optic 24. In alternative embodiments, the optical insert 23 does not fully enclose the sidewalls 24a and/or base 24b of the waveguide optic 24.

One or more reflective sidewalls 23a of the optical insert 23 can be selectively positioned in the compartment 22 of the optic housing 21. In such embodiments, the reflective sidewalls 21b and or base wall 21c of the optic housing 21 can work in conjunction with the optical insert 23 to provide desired lighting distributions from the optical assembly 20.

Figure 3:
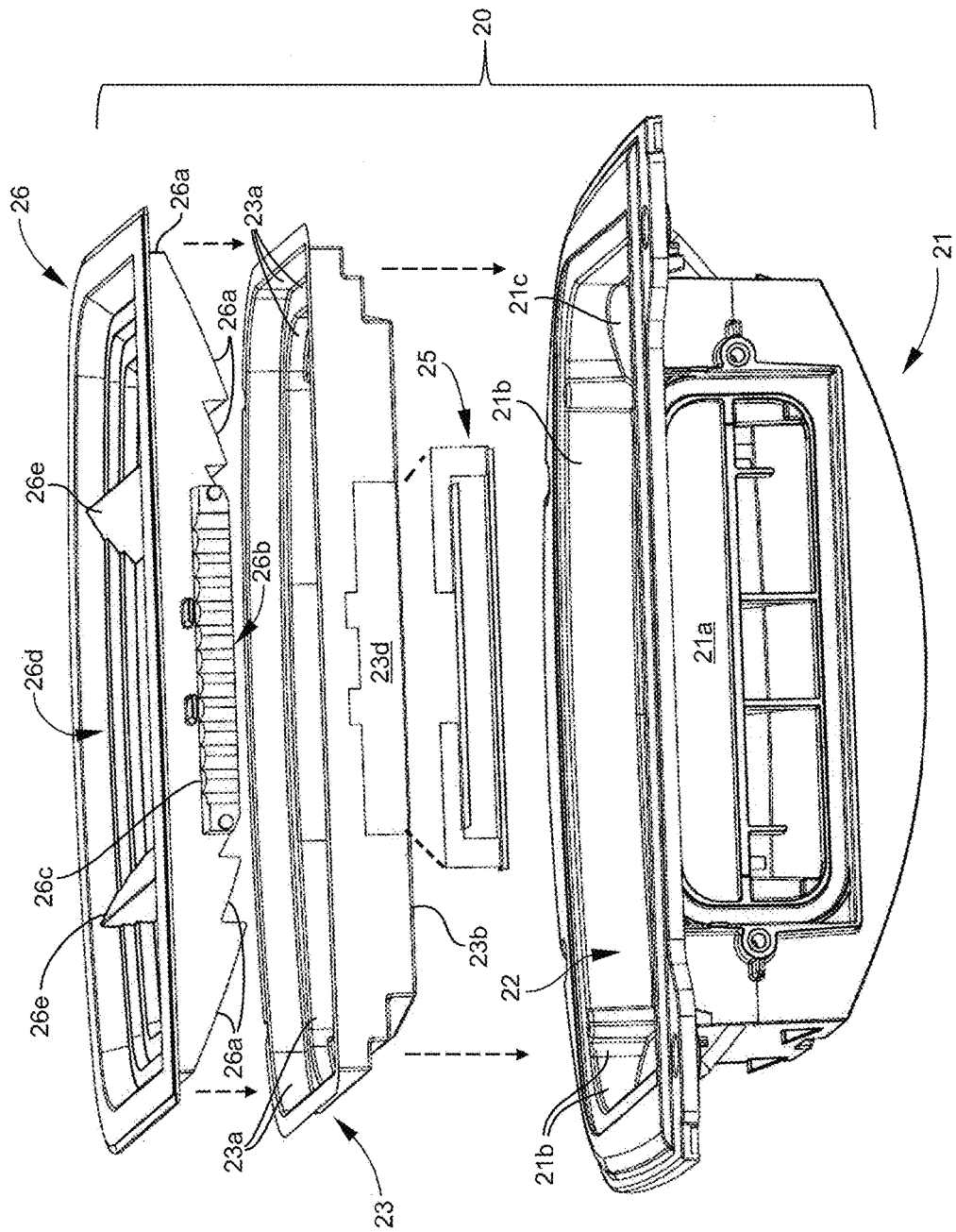
FIG. 3 illustrates an exploded view of an optic assembly of a lighting device according to some embodiments.

FIG. 3 also provides an exploded view of another optical assembly of a light emitting device according to some embodiments. Components of the optical assembly in FIG. 3 are the same as in FIG. 2 with the exception being the waveguide optic 26 is of different design. The light extraction face 26d of the waveguide optic in FIG. 3 comprises a stepped architecture with prismatic rib-like light extraction elements 26e. The sidewalls 26a and base 26b of the waveguide optic 26 also exhibit differing design from FIG. 2, thereby enabling the optic assembly 20 to provide alternative lighting distributions. Features, elements and lighting distribution of the waveguide optic of FIG. 3 are further described in U.S. patent application Ser. No. 14/657,988 entitled "Luminaire Utilizing Waveguide" by Wilcox et al. incorporated herein by reference in its entirety.

Figure 4:
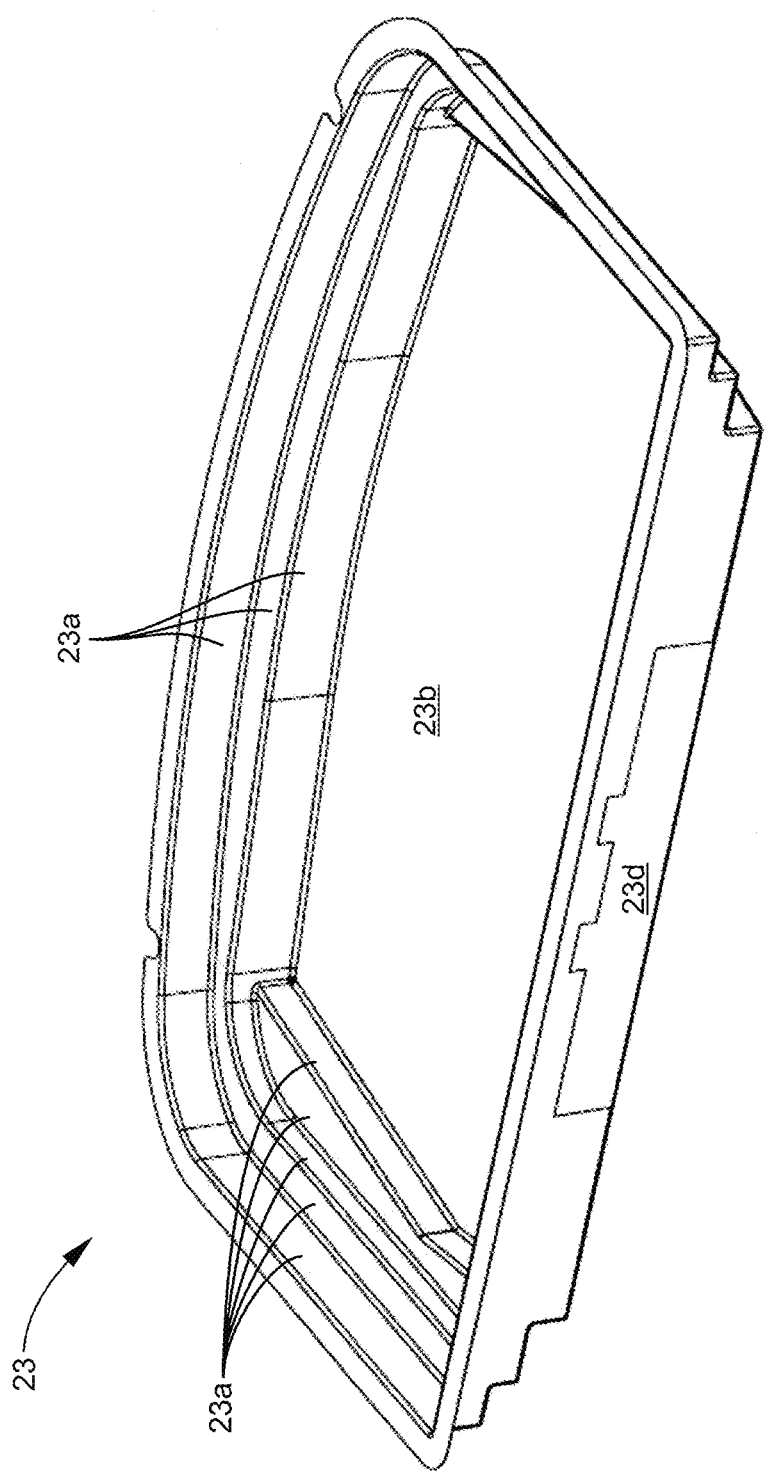
FIG. 4 is a perspective view of the optical insert employed in the optic assembly of FIGS. 1 and 2.
Figure 6B:
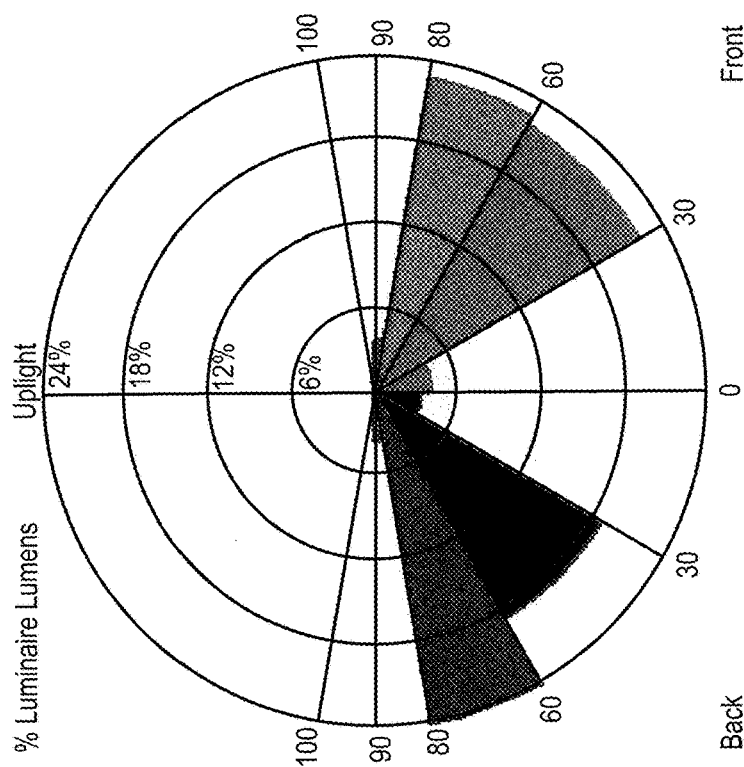
FIG. 6(b) illustrates a lighting simulation performed with the optic assembly of FIG. 2 according to some embodiments.
Figure 6A:
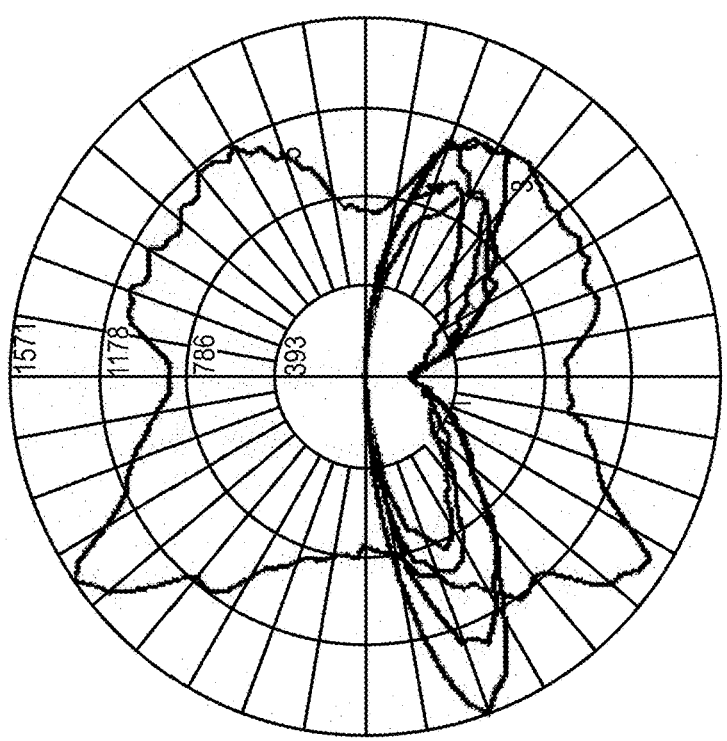
FIG. 6(a) illustrates light distribution of the optic assembly of FIG. 2 according to some embodiments.
Figure 7B:
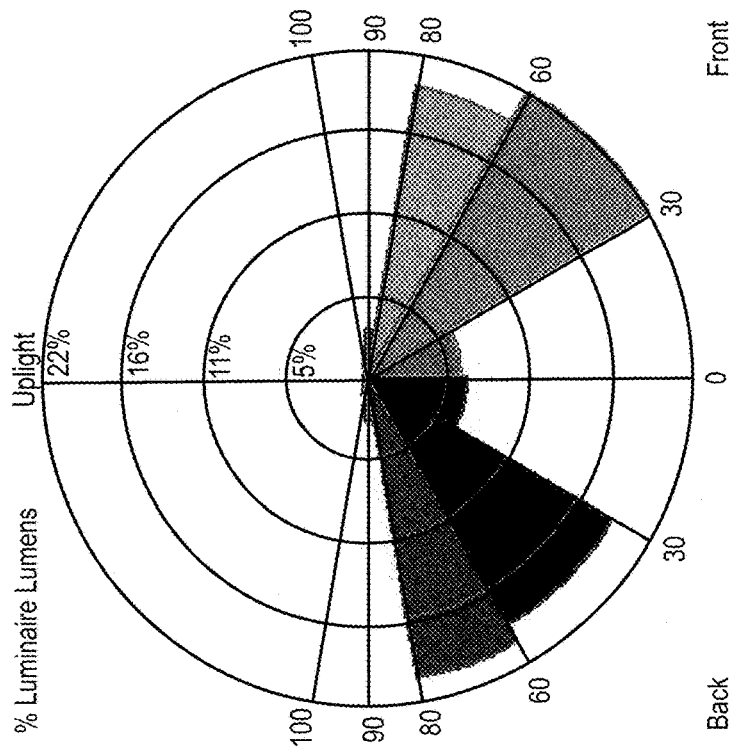
FIG. 7(b) illustrates a lighting simulation performed with the optic assembly of FIG. 2 wherein the optical insert is absent according to some embodiments.
Figure 7A:
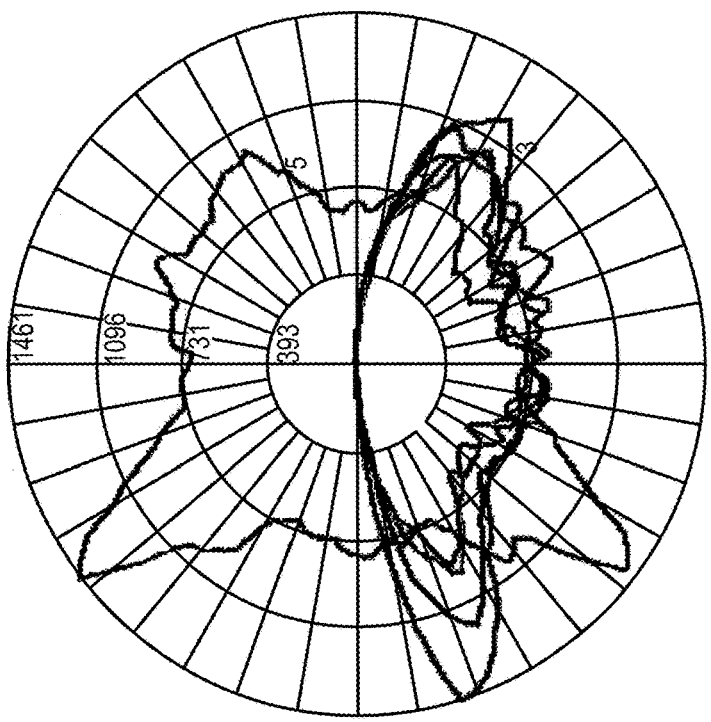
FIG. 7(a) illustrates light distribution of the optic assembly of FIG. 2 when the optical insert is absent according to some embodiments.

FIG. 4 is a perspective view of the optical insert 23 employed in the optic assembly 20 of FIGS. 2 and 3. The terraced reflective sidewalls 23a form a continuous border for enclosing sidewalls of the waveguide optic. The base wall 23b is planar for receiving the base of the waveguide optic. The sidewall aperture 23d permits interfacing between a light source and the light coupling region of the waveguide optic. The reflective sleeves are provided as a separate piece for coupling around the sidewall aperture 23d as described herein. FIG. 5(a) illustrates a top plan view of the optical insert 23. As illustrated in FIG. 5(a), the reflective sidewalls 23a include straight and curved sections to form a continuous border for covering and/or enclosing sidewalls of the waveguide optic. FIG. 5(b) is a cross-sectional view of the optical insert taken along the A-A line of FIG. 5(a). The reflective sidewalls 23a are normal or substantially normal to the base wall 23b. For waveguide optics 24, 26 having designs and features illustrated in FIGS. 2 and 3, normal orientation of the reflective sidewalls relative to the reflective base wall of the optical insert can redirect light exiting waveguide sidewalls to pass through the extraction face at angles greater than 60 degrees relative to an axis normal to the extraction face. This wide angle distribution of light can enable the optic assembly to meet the requirements of Type 5 and/or Type 2 lighting distributions. FIG. 6(a), for example, illustrates the light distribution provided by the optic assembly of FIG. 2. The waveguide optic 24 in conjunction with the optical insert 23 provides a Type 5 distribution with peak lighting intensity greater than 60 degrees. FIG. 6(b) illustrates a lighting simulation wherein zonal lumens of 60-80 degrees are higher in the front and back directions in comparison to zonal lumens of 30-60 degrees. Moreover, light is substantially equally distributed between front and back. FIG. 7(a) illustrates light distribution of the optic assembly of FIG. 2 when the optical insert 23 is absent and the waveguide optic 24 is positioned directly in the compartment 22 defined by the optic housing 21. As provided in FIG. 7(b), the absence of the optical insert 23 increases light output at lower angles (e.g. less than 60 degrees), which is not desirable for achieving Type 5 distribution.

Figure 8:
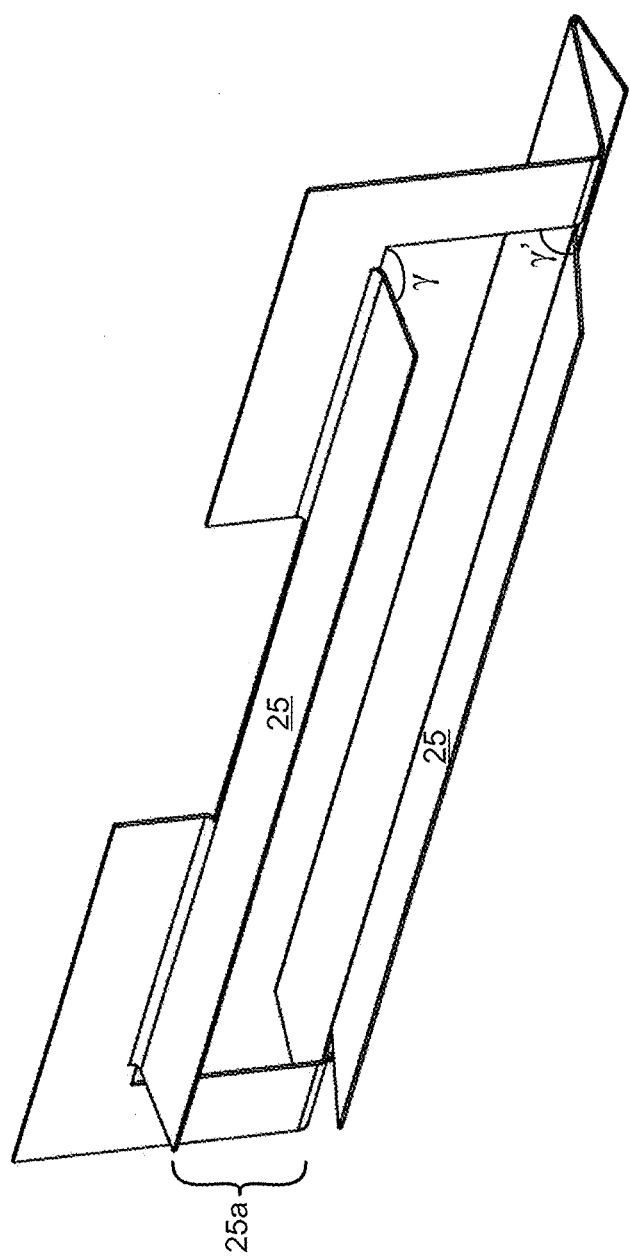
FIG. 8 illustrates reflective sleeves provided as a separate piece for coupling with the optical insert according to some embodiments.

As described in FIGS. 2 and 3, the optical insert 23 can comprise reflective sleeves 25 adjacent to the sidewall aperture 23d. The reflective sleeves can be integral with the optical insert 23 or provided as a separate piece. FIG. 8 illustrates reflective sleeves 25 provided as a separate piece for coupling with the optical insert 23 according to some embodiments. The reflective sleeves 25 have dimensions for covering the light coupling region 24c of the waveguide optic 24. Moreover, the reflective sleeves 25 can form an aperture entrance geometry 25a matching geometry of the waveguide optic 24. In some embodiments, for example, the waveguide optic tapers in the light coupling region 24c. The reflective sleeves 25 can be angled ($\gamma$, $\gamma'$) to match taper angle and/or geometry of the light coupling region 24c. Accordingly, $\gamma$ and $\gamma'$ can be varied independent of one another in response to geometrical considerations of the light coupling region 24c. In some embodiments, $\gamma$ and $\gamma'$ have the same value. For example, $\gamma$ and $\gamma'$, in one embodiment, are each 80.7 degrees. In other embodiments, $\gamma$ and $\gamma'$ are different values.

Figure 9:
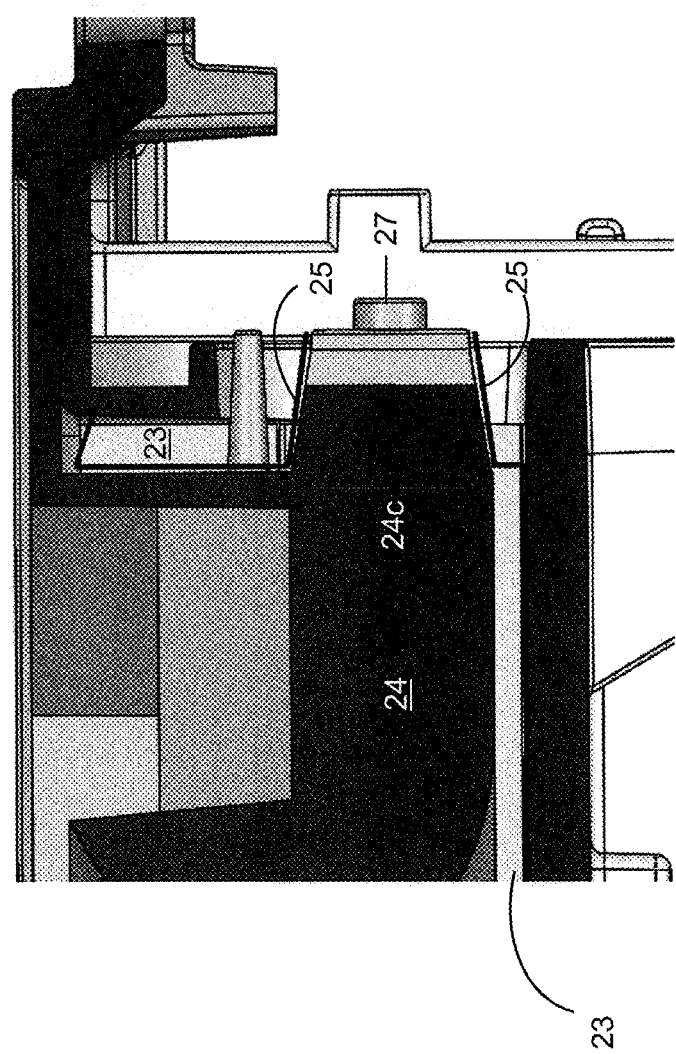
FIG. 9 illustrates reflective sleeves covering and matching geometry of a light coupling region of a waveguide optic according to some embodiments.

FIG. 9 illustrates reflective sleeves covering and matching geometry of a light coupling region of a waveguide optic according to some embodiments. As illustrated in FIG. 9, the waveguide optic 24 tapers in the light coupling region 24c to meet the LEDs. The reflective sleeves 25 of the optical insert 23 match the taper angle of the waveguide optic 24, thereby providing an aperture entrance geometry matching geometry of the waveguide optic 24 in the light coupling region 24c. The reflective sleeves 25 can return light to the waveguide optic 24 that has escaped in the light coupling region 24c. Light rays failing to meet total internal reflection requirements in the coupling region can leak out of the waveguide optic 24. The reflective sleeves redirect these light rays back into to the coupling region 24c for redistribution in the waveguide optic 24 leading to optical efficiency enhancements. In the embodiment of FIG. 9, the waveguide optic 24 comprises an alignment pin 27 for aligning an LED array board with the light coupling region 24c.

Figure 10:
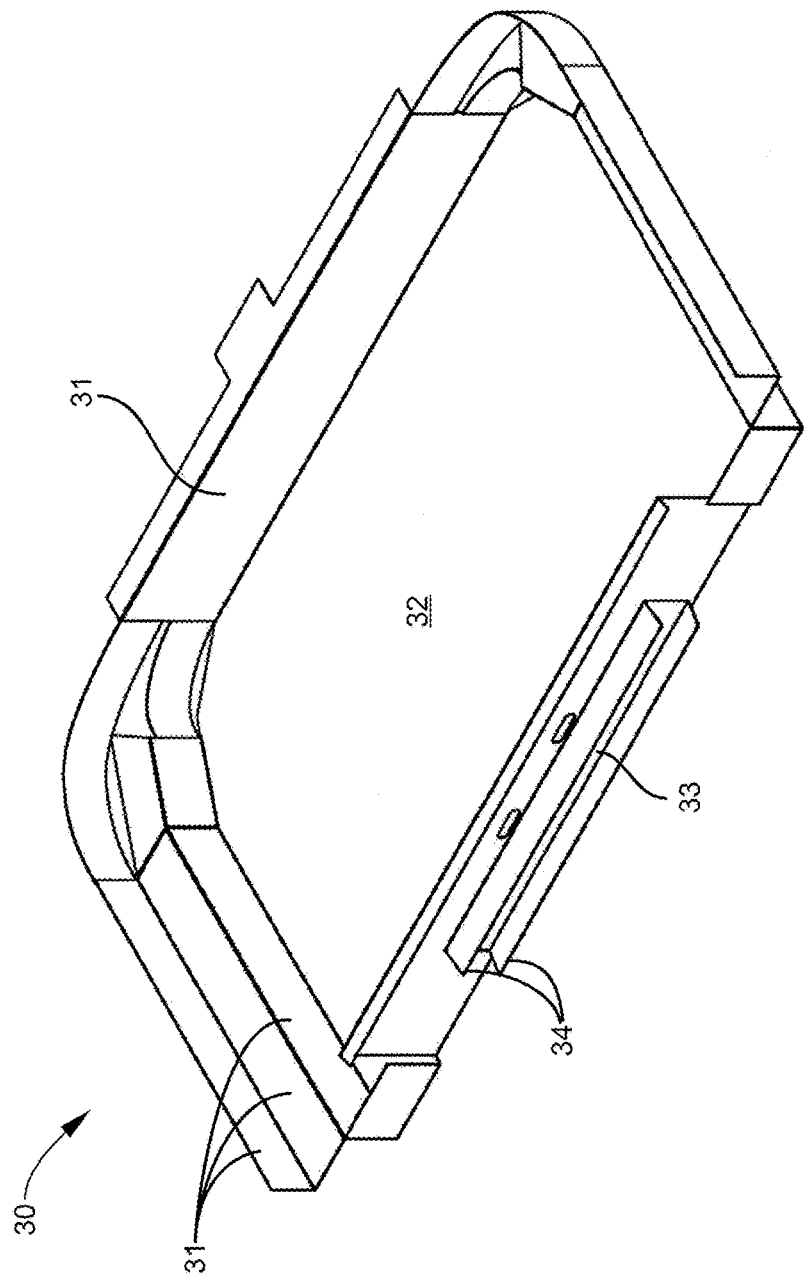
FIG. 10 illustrates a perspective view of an optical insert according to some embodiments.

FIG. 10 illustrates a perspective view of another embodiment of an optical insert. The optical insert 30 of FIG. 10 comprises reflective sidewalls 31 and a reflective base wall 32. The reflective sidewalls 31 are terraced in several regions of the optical insert 30. The reflective sidewalls 31 are also normal to the planar reflective base wall 32. For waveguide optics 24, 26 having designs and features illustrated in FIGS. 2 and 3, normal orientation of the reflective sidewalls relative to the reflective base wall of the optical insert can redirect light exiting waveguide sidewalls to pass through the extraction face at angles greater than 60 degrees relative to an axis normal to the extraction face. This wide angle distribution of light can enable the optic assembly to meet the requirements of Type 5 and/or Type 2 lighting distributions as discussed in relation to FIGS. 6(a) and 6(b). The optical insert 30 comprises a sidewall aperture 33 for interfacing for interfacing the waveguide optic with a light source. Reflective sleeves 34 are adjacent to the sidewall aperture 33 for covering the light coupling region of a waveguide optic as described herein.

Figure 11:
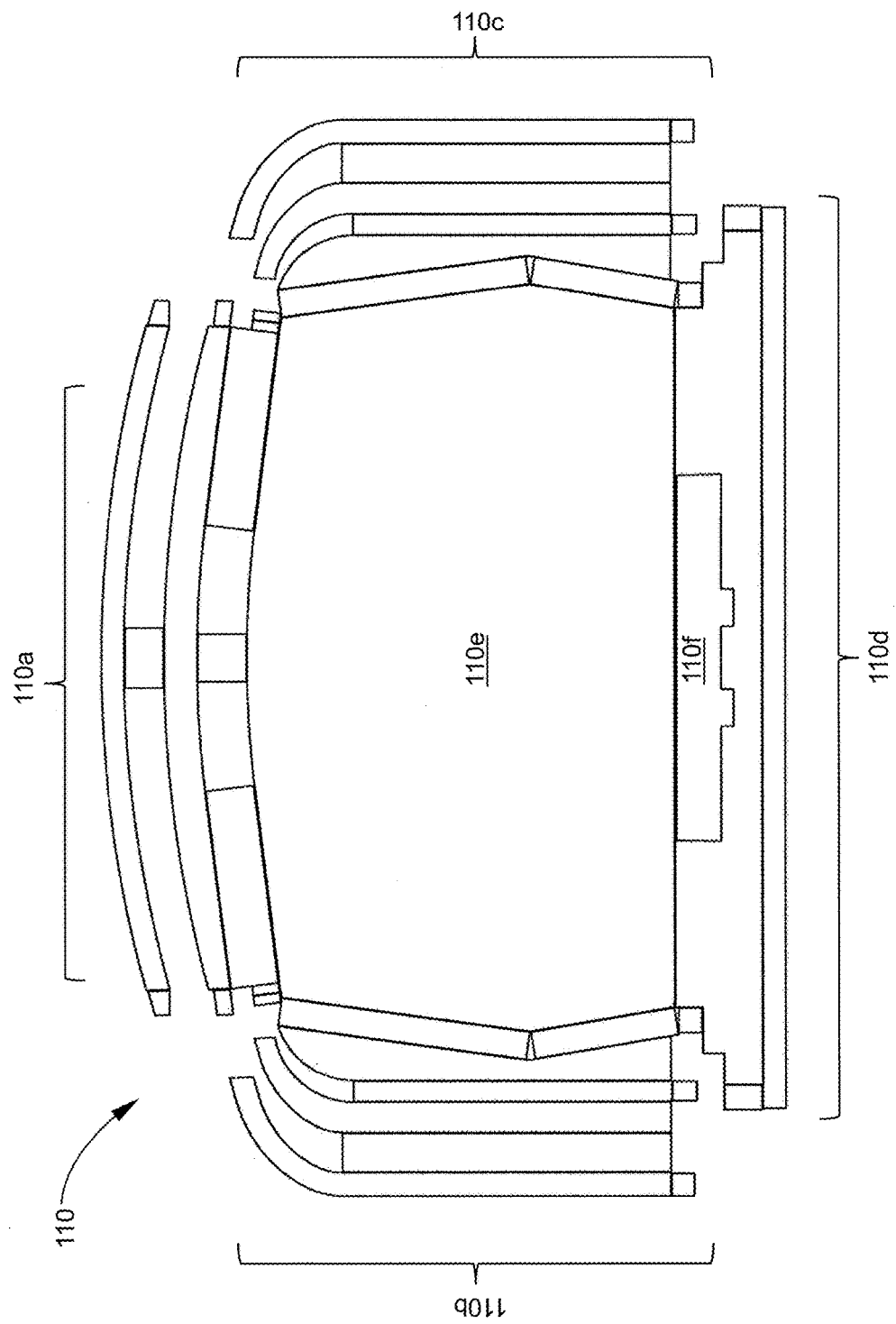
FIG. 11 illustrates a sheet of reflective material that is folded into the optical insert of FIG. 10 according to some embodiments.

As described herein, an optical insert can be formed of a single sheet of reflective material. In some embodiments, a sheet of reflective material is cut into the proper format and folded into the optical insert. For example, a sheet of specularly reflective material can be laser cut to the desired format and folded into the optical insert. FIG. 11 illustrates a sheet of reflective material that is folded into the optical insert of FIG. 10. As provided in FIG. 11, the sheet 110 comprises flaps 110a, 110b, 110c, 110d operable to be folded into the reflective sidewalls 31. The sheet includes a planar center 110e forming the reflective base wall 32 of the optical insert 30. An aperture 110f is cut into reflective sidewall 110d for receiving the optical coupling region of the waveguide optic. In other embodiments, an optical insert can be fabricated by a thermoforming processes as described herein.

Figure 12:
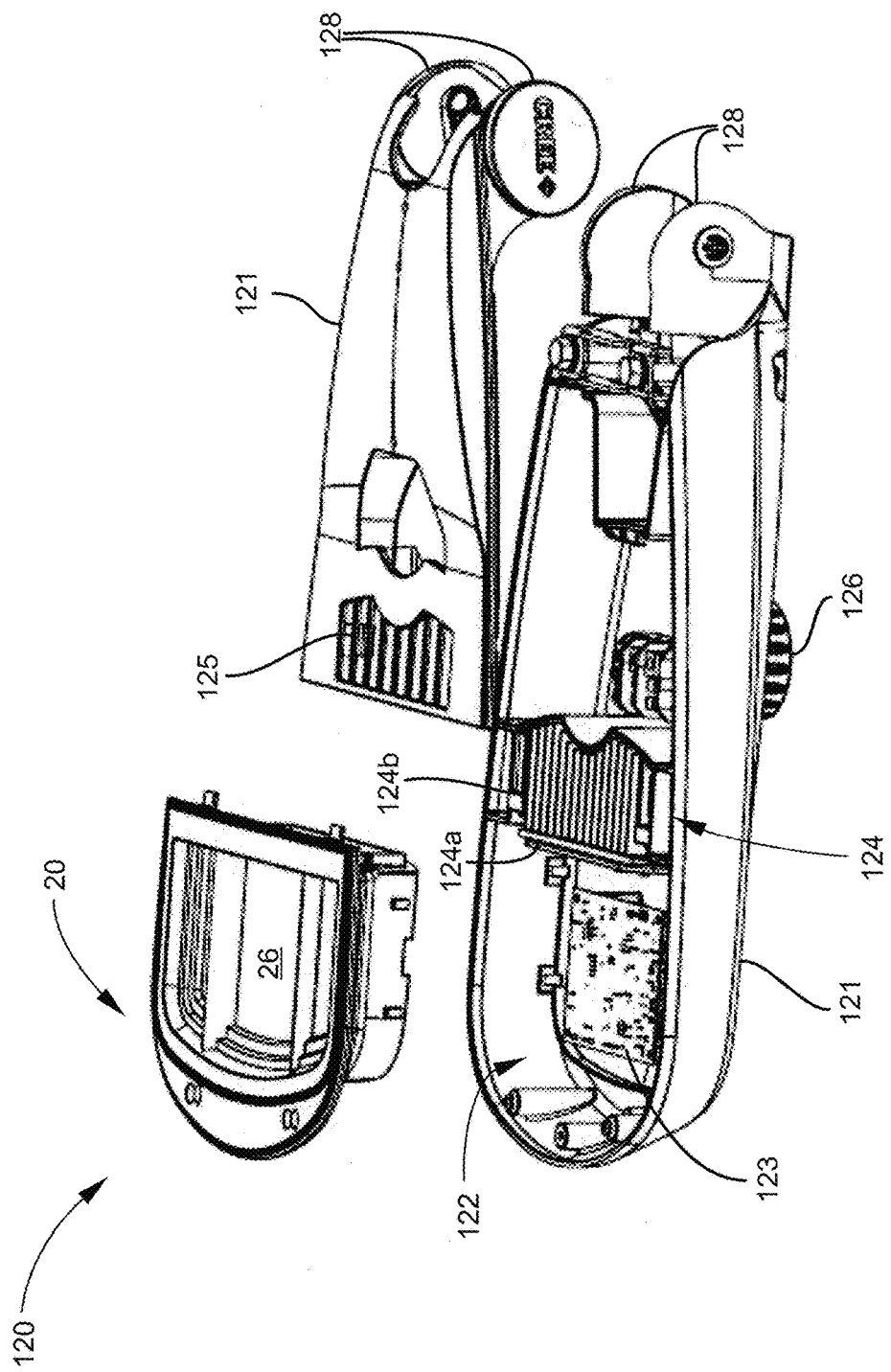
FIG. 12 illustrates integration of the optic assembly of FIG. 3 into a luminaire according to some embodiments.

Referring again to FIGS. 2 and 3, the optic housing 21 can be a standard or universal optic housing for one or more luminaire constructions. Specific lighting distribution of the optic assembly is controlled by selection of the waveguide optic 24, 26 and optical insert 23. FIG. 12 illustrates integration of the optic assembly 20 of FIG. 3 into a luminaire 120 according to one embodiment. The luminaire comprises a housing 121. The housing 121 includes a compartment 122 for receiving the optic assembly 20. Driver circuitry and associated electronics 123 are positioned in the compartment 122 adjacent to the optic assembly 20. A LED assembly 124 is positioned in the housing 121 adjacent to the optic assembly 20. The LED assembly 124 comprises an array of LEDs 124a interfacing with a side of the waveguide optic 26. The LED assembly 124 also comprises heatsink 124b for the LEDs 124a. Vents 125 are provided in the housing for dissipating heat from the LED assembly 124.

LED light sources may comprise packaged LED chip(s) or unpackaged LED chip(s). LED elements or modules can use LEDs of the same or different types and/or configurations. The LEDs, for example, can be monochromatic or any desired color combination. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to a heat sink or another type of board or substrate. Depending on the embodiment, LED arrangements or lighting arrangements using remote phosphor technology can be employed as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts along one or more edges of the waveguide body, as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein.

A sensor module 126 may be positioned on the housing for sensing ambient light conditions and/or other conditions including, but not limited to, temperature, humidity, carbon dioxide, carbon monoxide, volatile organic compounds, sound and mechanical vibration and acceleration. The sensor module can also comprise radio frequency (rf) communication apparatus. The luminaire, for example, can be part of a wireless distributed lighting network. For example, luminaires of the network may communicate with one another via Institute of Electrical and Electronic Engineers standard 802.15 or some variant thereof. Using a wireless mesh network to communicate between luminaires may increase the reliability thereof and allow the wireless lighting network to span large areas. Examples of luminaires and wireless network architectures employing rf communication are provided in U.S. Patent Application Ser. No. 62/292,528, titled Distributed Lighting Network referenced above. When rf communication apparatus is included in the sensor module, rf-transmissive materials are can be employed in the construction of luminaire component(s) so as not to interfere with rf transmission or reception.

Figure 13:
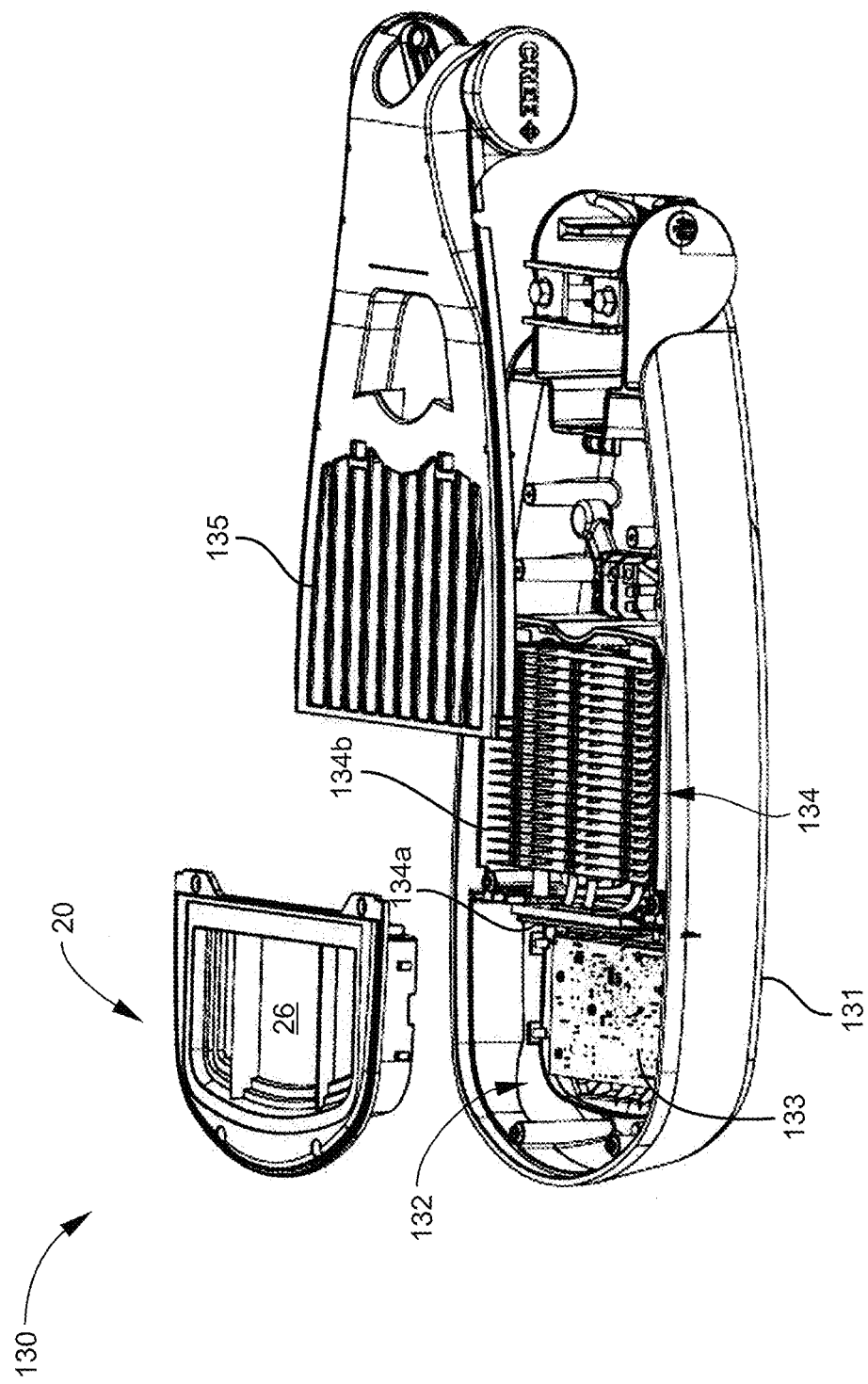
FIG. 13 illustrates integration of the optic assembly of FIG. 3 into a luminaire according to some embodiments.

The housing also comprises a mounting portion 128 for coupling the luminaire to a pole, post or other support apparatus. FIG. 13 illustrates an exploded view of a luminaire employing an optic assembly according to some embodiments. The optic assembly 20 comprises a structure illustrated in FIG. 3 herein. The luminaire comprises a housing 131. The housing 131 includes a compartment 132 for receiving the optic assembly 20. Driver circuitry and associated electronics 133 are positioned in the compartment 132 adjacent to the optic assembly 20. A LED assembly 134 is positioned in the housing 131 adjacent to the optic assembly 20. The LED assembly 134 comprises an array of LEDs 134*a* interfacing with a side of the waveguide optic 26. The LED assembly 134 also comprises heatsink 134*b* for the LEDs 134*a*. Vents 135 are provided in the housing for dissipating heat from the LED assembly 134. Luminaires having design and construction described herein can be employed in various applications including roadway lighting, sidewalk lighting and/or parking lot lighting. Additional applications include warehouse or arena lighting as well as aisle lighting.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A lighting device comprising:
an optic housing;
a waveguide optic; and
an optical insert positioned in the housing between the waveguide optic and optic housing, the optical insert comprising one or more reflective sidewalls for redirecting light emitted from the waveguide optic.

2. The lighting device of claim 1, wherein the waveguide optic comprises sidewalls and a light extraction face, wherein the reflective sidewalls of the optical insert cover at least a portion of the sidewalls of the waveguide optic.

3. The lighting device of claim 2, wherein the one or more reflective sidewalls of the optical insert form a continuous border enclosing the sidewalls of the waveguide optic.

4. The lighting device of claim 2 further comprising a light source adjacent to a sidewall of the waveguide optic.

5. The lighting device of claim 4, wherein the light source comprises a plurality of light emitting diodes.

6. The lighting device of claim 4, wherein the optical insert comprises an aperture for interfacing the waveguide optic with the light source.

7. The lighting device of claim 6, wherein the optical insert further comprises reflective sleeves adjacent to the aperture, the sleeves covering a light coupling region of the waveguide optic.

8. The lighting device of claim 7, wherein the reflective sleeves form an aperture entrance geometry matching geometry of the waveguide optic.

9. The lighting device of claim 7, wherein the reflective sleeves comprise a specularly reflective surface.

10. The lighting device of claim 1, wherein the optical insert is a singular piece.

11. The lighting device of claim 1, wherein the reflective sidewalls are provided in multiple pieces.

12. The lighting device of claim 1, wherein the reflective sidewalls of the optical insert redirect light emitted from sidewalls of the waveguide optic to provide peak emission from the lighting device at angles greater than 60 degrees relative to nadir.

13. The lighting device of claim 2, wherein the optical insert further comprises a reflective base wall.

14. The lighting device of claim 13, wherein the one or more reflective sidewalls and reflective base wall define a reflective compartment in which the waveguide optic is positioned.

15. The lighting device of claim 13, wherein the one or more reflective sidewalls form an angle with the reflective base wall of 85 degrees to 95 degrees.

16. The lighting device of claim 13, wherein the one or more reflective sidewalls are normal to the base wall.

17. The lighting device of claim 1, wherein the reflective sidewalls are terraced.

18. The lighting device of claim 1, wherein the one or more reflective sidewalls comprise a specularly reflective surface.

19. The lighting device of claim 13, wherein the one or more reflective sidewalls and base wall are formed of reflective sheets.

20. The lighting device of claim 13, wherein the one or more reflective sidewalls and base walls are formed of plastic comprising metallized surfaces.

21. An optical insert of an optic assembly, the optical insert comprising two or more reflective sidewalls for redirecting light emitted from a waveguide optic housed by the assembly, the waveguide optic comprising sidewalls and a light extraction face.

22. The optical insert of claim 21, wherein the reflective sidewalls are arranged to cover at least a portion of the waveguide optic sidewalls.

23. The optical insert of claim 21, wherein the reflective sidewalls form a continuous border for at least partially enclosing sidewalls of the waveguide optic.

24. The optical insert of claim 21 further comprising a sidewall aperture for interfacing a waveguide optic sidewall with a light source.

25. The optical insert of claim 24, wherein the light source comprises a plurality of light emitting diodes.

26. The optical insert of claim 24 further comprising reflective sleeves adjacent to the aperture, the sleeves having dimensions to cover a light coupling region of the waveguide optic.

27. The optical insert of claim 26, wherein the reflective sleeves form an aperture entrance geometry matching geometry of the waveguide optic.

28. The optical insert of claim 26, wherein the reflective sleeves are continuous with the sidewall aperture.

29. The optical insert of claim 26, wherein the reflective sleeves are detachable from the sidewall aperture.

30. The optical insert of claim 21, wherein the optical insert is a singular piece.

31. The optical insert of claim 21, wherein the reflective sidewalls are provided in multiple pieces.

32. The optical insert of claim 22, wherein the reflective sidewalls are configured to redirect light emitted from sidewalls of the waveguide optic to provide peak emission from the waveguide optic at angles greater than 60 degrees relative to nadir.

33. The optical insert of claim 21 further comprising a reflective base wall.

34. The optical insert of claim 33, wherein the one or more reflective sidewalls and reflective base wall define a reflective compartment for receiving the waveguide optic.

35. The optical insert of claim 33, wherein the one or more reflective sidewalls form an angle with the base wall of 85 degrees to 95 degrees.

36. The optical insert of claim 33, wherein the one or more reflective sidewalls are normal to the reflective base wall.

37. The optical insert of claim 21, wherein the reflective sidewalls are terraced.

38. The optical insert of claim 21, wherein the one or more reflective sidewalls comprise a specularly reflective surface.

39. A lighting device comprising:
an optic housing;
a light source positioned in the optic housing;
a waveguide optic; and
an optical insert positioned in the housing, the optical insert comprising one or more reflective sidewalls for redirecting light emitted from the waveguide optic.

* * * * *